United States Patent
Allam et al.

(10) Patent No.: US 8,301,477 B2
(45) Date of Patent: Oct. 30, 2012

(54) CONSOLIDATING PROCESSES FOR MULTIPLE VARIATIONS

(75) Inventors: Abdul Allam, Raleigh, NC (US);
Douglas E. Darbyshire, Lenexa, KS (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/861,225

(22) Filed: Aug. 23, 2010

(65) Prior Publication Data
US 2012/0046980 A1     Feb. 23, 2012

(51) Int. Cl.
*G06Q 10/00* (2012.01)
(52) U.S. Cl. ............... 705/7.12; 705/7.22; 705/7.23; 705/7.25; 705/7.27
(58) Field of Classification Search ............ 705/7.25, 705/7.27, 7.12, 7.22, 7.23
See application file for complete search history.

(56) References Cited

U.S. PATENT DOCUMENTS

| | | | |
|---|---|---|---|
| 2002/0165745 A1* | 11/2002 | Greene et al. | 705/7 |
| 2002/0178026 A1* | 11/2002 | Robertson et al. | 705/1 |
| 2005/0144226 A1* | 6/2005 | Purewal | 709/203 |
| 2007/0006132 A1* | 1/2007 | Weinstein et al. | 717/104 |
| 2007/0021995 A1* | 1/2007 | Toklu et al. | 705/7 |
| 2008/0312992 A1* | 12/2008 | Hoshi et al. | 705/7 |
| 2009/0024372 A1* | 1/2009 | Chen et al. | 703/6 |

OTHER PUBLICATIONS

Remco Dijkman, A Classifiction of Differences between Similar Business Processes, 11th IEEE International Enterprise Distributed Object Computing Conference, 2007, pp. 37-47.
Dat C. Ma, Joe Y.-C. Lin and Maria E. Orlowska, Automatic merging of work items in business process management systems, Business process management, 2007, pp. 14-28 (abstract only).
Marlon Dumas, Luciano Garcia-Banuelos and Remco Dijkman, Similarity Search of Business Process Models, IEEE, 2009, pp. 1-6.

* cited by examiner

*Primary Examiner* — Thomas Dixon
*Assistant Examiner* — Gerald Vizvary
(74) *Attorney, Agent, or Firm* — Patrick J. Daugherty; Driggs, Hogg, Daugherty & Del Zoppo Co., LPA

(57) ABSTRACT

Harmonizing business process tasks comprehends comparing descriptors associated with each of a plurality of business process tasks in response to a process variation input and identifying tasks as a candidate task pair for consolidation. Input and output attributes of the candidate pair tasks are compared and consolidation confirmed if the compared input and output attributes are similar. Consolidating the confirmed candidate pair tasks includes merging the confirmed candidate pair into a new merged task or replacing one with the other, and an output from the consolidated candidate pair is generated as a common harmonized output for the first and second tasks. Identifying the candidate task pairs for consolidation may be a function of similarity of task descriptors, of input/output business process relationships to other candidate task pairs, and also of both.

17 Claims, 4 Drawing Sheets

CONSOLIDATING PROCESSES FOR MULTIPLE VARIATIONS

BACKGROUND

The present invention relates to service-oriented architecture, and more particularly to consolidating processes for multiple service variations.

Service-oriented architecture (SOA) methods, systems and governance models develop and deploy multiple shareable and reusable services across an SOA enterprise for use by multiple users. Key objectives of SOA are flexibility and agility in business processes and the underlying IT capabilities that support these processes. Generally, whenever a new user need of variation in tasks is observed or required, a new process is created and implemented within the SOA model for use by other users, which results in a corresponding expansion of resources required in implementation of the SOA.

BRIEF SUMMARY

One embodiment of a method for harmonizing business process tasks comprehends comparing descriptors associated with each of a plurality of business process tasks via a programmable device in response to a process variation input and identifying a first and a second of the tasks as a candidate task pair for consolidation. Input and output attributes of the candidate pair tasks are compared and consolidation confirmed if the compared input and output attributes are similar. Consolidating the confirmed candidate pair tasks includes merging the confirmed candidate pair into a new merged task or replacing one with the other, and an output from the consolidated candidate pair is generated as a common harmonized output for the first and second tasks.

In another embodiment, a computer system for harmonizing business process tasks includes a processing unit, computer readable memory, a computer readable storage system and program instructions stored on the computer readable storage system for execution by the processing unit via the computer readable memory to compare descriptors associated with each of a plurality of business process tasks in response to a process variation input, and identify a first task and second task as a candidate task pair for consolidation. The program instructions are also to compare input and output attributes of each of the candidate pair tasks, confirm consolidation of the candidate pair tasks if the compared input and output attributes are similar, and consolidate the confirmed candidate pair tasks by either merging the confirmed candidate pair into a new merged task or replacing one with the other of the first and second tasks, the consolidated candidate pair tasks to generate an output as a common harmonized output for the first and second tasks.

In another embodiment, a computer program product for harmonizing business process tasks comprehends a computer readable storage medium and program instructions stored therein to compare descriptors associated with each of a plurality of business process tasks in response to a process variation input, and identify a first task and a second task of the plurality of business process tasks as a candidate task pair for consolidation. The program instructions are further to compare input and output attributes of each of the candidate pair tasks and confirm consolidation of the candidate pair tasks if the compared input and output attributes are similar, the consolidation merging the confirmed candidate pair into a new merged task or replacing one with the other of the first and second tasks, the consolidated candidate pair tasks thus to generate an output as a common harmonized output for the first and second tasks.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
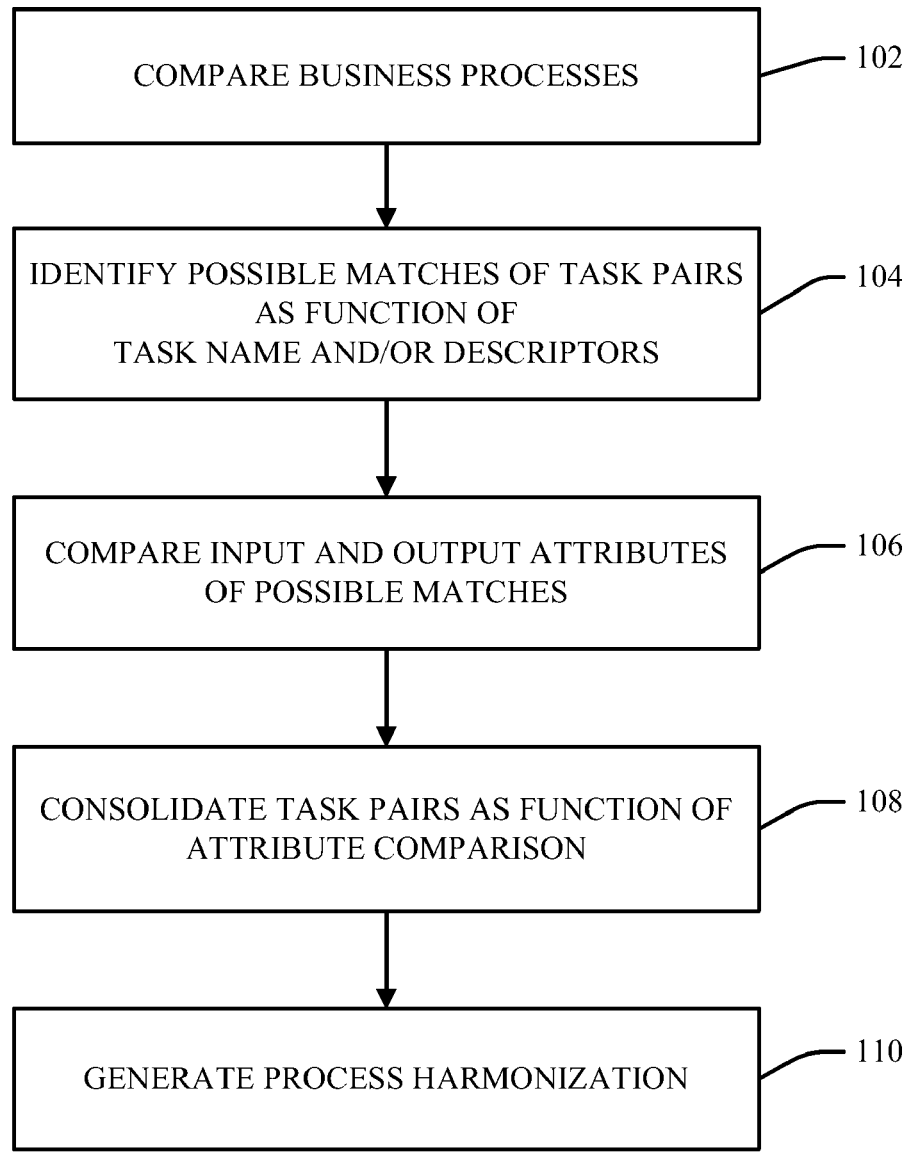
FIG. 1 illustrates an embodiment of a method or system for consolidating processes for multiple service variations according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Objectives of SOA implementation include flexibility and agility in business processes and in the underlying information technology (IT) capabilities that support these processes. This need for flexibility and agility requires technique and tool support to identify and support variations and to provide a common view of various aspects of business process during analysis and decomposition of the SOA, which requires analysis of tasks, activities, information elements, rules and events associated with each business process. Conventional SOA process modeling entails new process creation whenever a variation in tasks is observed, in order to responsively provide a comprehensive and robust presentation of requested services to all users across an enterprise.

However, such approaches lack focus on unifying business processes provided, and typically lack rigor in analyzing extant SOA tasks and associated information elements for determining the ability and availability of extant resources to meet the needs of the new variants. This may result in needlessly expanding resource offering and requirements when already existing and implemented services may also satisfy the new variant or service requested.

Missed opportunities in recognizing the availability of one business process to serve two or more service requests is often due to variations in content and context between existing processes and the new variants which inhibit recognition of the possibility of utilizing or altering already extant resources. More particularly, whenever a variation in tasks is observed, in prior art SOA governance a new process is created, instead of trying to consolidate and unify processes. This leads to proliferation of business processes that may result in creation of redundant tasks and candidate services.

However, combining tasks in SOA implementation may be problematic. A reduction in business processes by combining tasks based on their description without consideration for incompatible input and output information requirements may result in degradation of the potential re-usability of tasks, as tasks combined based on common task descriptions may have incompatible input and output information requirements. Task descriptors, for example names, text descriptions, etc., may also indicate that two tasks are different, but in reality they may be performing partial capabilities that can be combined as a unified task. Thus, it is difficult in the prior art to combine processes with many similar tasks into a unified business process, to harmonize concepts, terminology and semantics already inherent in silo'ed business operations. Accordingly, in prior art SOA governance it may be difficult to analyze systematically various components of business processes being compared, and it may be a daunting task to compare two business processes with even medium complexity.

Figure 2:
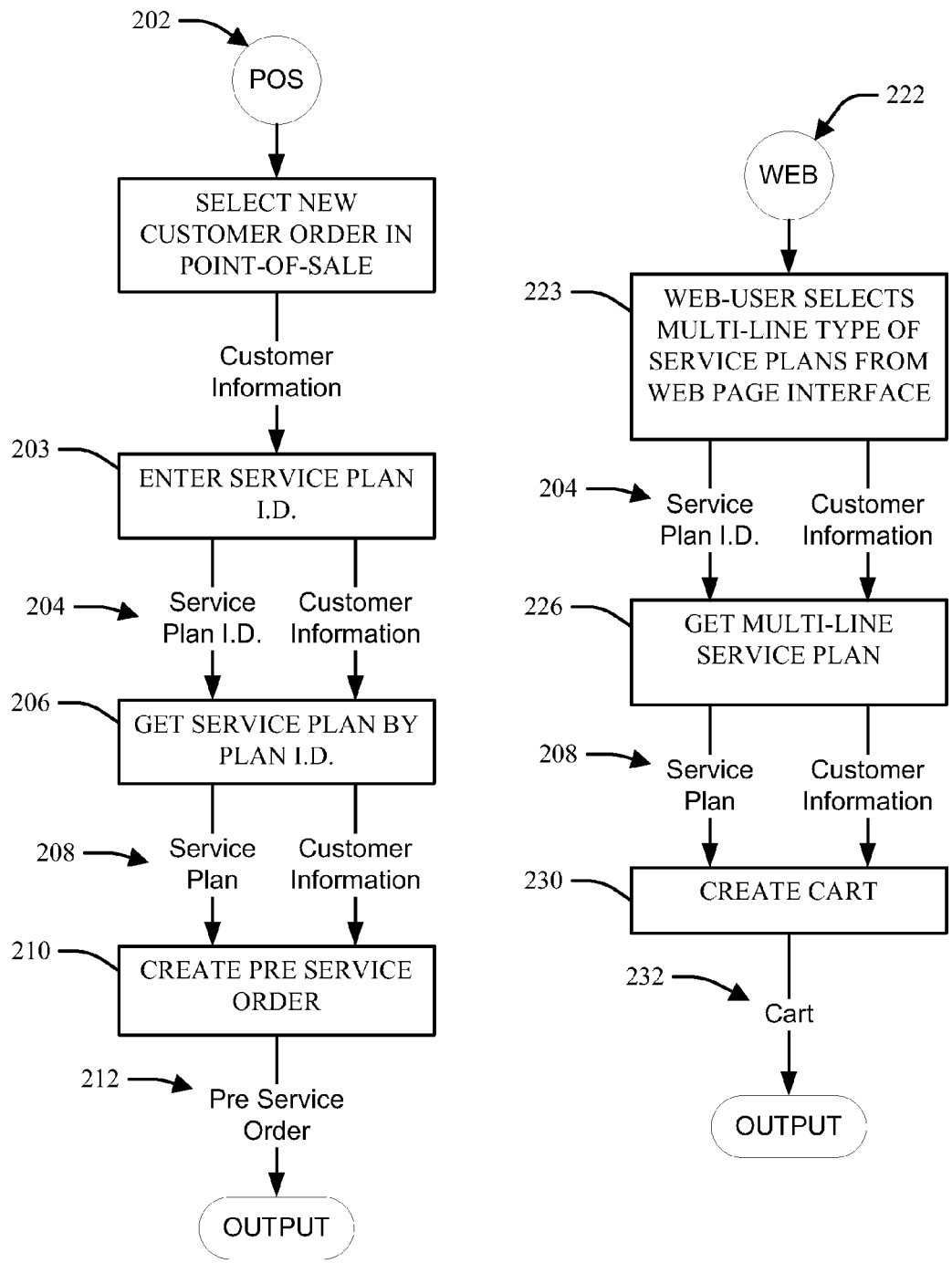
FIG. 2 provides a diagrammatic illustration of two processes of a service-oriented architecture.

FIG. 1 illustrates a system for harmonizing and unifying SOA business process according to the present invention by consolidating processes for multiple service variations. At 102 the tasks of two or more business processes are automatically compared by a programmable device for potential for harmonizing and unifying in response to a process variation input. Each of the processes generally comprises a plurality of tasks, also sometimes referred to as business items or business entities in SOA models. The process variation input may be a request for a new service or service variation, a prompt to search for redundancies in an extant SOA model or in a model formulation process prior to implementation, and other process variation inputs may be practiced. In one exemplary SOA embodiment for a telecommunications industry implementation depicted in FIG. 2, a first point of sale (POS) process 202 and a second web-based process 222 are compared at 102, though it will be understood that other SOA processes and implementations may be practiced with the present invention.

In the present example, descriptors associated with each of the tasks of processes 202 and 222 are compared at 104 to identify matching task candidates. The descriptors may include names, text descriptions, information elements, rules or events associated with each task, and other descriptors may also be considered. The comparison at 104 may comprehend an intra-process consideration of tasks (for example, comparing task 203 to the other tasks 206 and 210 within the first process 202) as well as inter-process consideration of tasks (for example, comparing first process 202 task 203 to each of the tasks 223, 226 and 230 of the other, second process 222).

In the present the "Get Service Plan by Plan ID" task 206 of the first process 202 is recognized as a potential match to the "Get Multi-Line Service Plan" task 226 of the second process 222 as a function of one or more of a name term similarity (sharing "get" and "service plan" terms), and a similarity of task descriptors (for example, "acquire telephone service plan that matches customer information and customer-selected plan identification" may be common to both tasks 206 and 226). The "Create Pre Service Order" task 210 and "Create Cart" 230 tasks may also be recognized as potential matches as a function of one or more of a name term similarity (sharing "Create" terms) and a similarity of task descriptors (for example, a common "create item for presentment to customer for purchase" acquire telephone service plan that matches customer information and customer-selected plan identification" task descriptor).

The relationship of a task to a preceding (predicate) or subsequent intra-process task may also indicate a possible match at 104. In one aspect, tasks occurring immediately before or after recognized candidate pair tasks in their respective business processes (in effect, linked in an input/output business process relationship) may be more likely to share common task input/output relationships, and accordingly this relationship may indicate, or be used as another factor in determining, a candidate match. A potential matching determination may be thus solely triggered and dependent on said intra-process relationship, or this relationship may be another factor for consideration in a comparison independently triggered by descriptor similarity, thus providing another decision factor. This may help find candidate matches that might otherwise be missed through only name or other text descriptor similarity analysis where said descriptor similarity is weak or not otherwise meeting a similarity threshold or criteria absent consideration of a relationship to other matching pairs that do meet said similarity threshold or criteria.

Accordingly, in some embodiments, a value of a degree of similarity may be determined in comparing task descriptors wherein this value must meet a similarity threshold criteria in order to identify matching candidates. This degree of similarity value may also be weighted or increased to generate an increased value as a function of recognizing input/output business process relationships to other candidate pairs, which may result in the weighted/increased value meeting the similarity threshold criteria which would otherwise not be met. In other words, the compared tasks may not have been similar enough in comparing descriptors to identify them as a candidate pair absent consideration of their process context (the input/output relationship to another candidate pair), this context recognition now elevating them to match candidate status. In the present example, recognition of the intra-process task pair 206/226 as match candidates may result in an automatic consideration of the respective predicate intra-process task pair 203/223 and subsequent intra-process task pair 210/230 as potential candidate matches, with task 203 compared directly to 223 and task 210 compared directly to task 230. In the present example, a resultant consideration of descriptor similarity finds that the task 203 is nonetheless not a potential match to 223 (any increased weighting of similarity values still not enough to meet a threshold criteria), but that task 210 is determined a potential match to task 230.

In response to identifying possible harmonizing or matching candidates at 104, both the input and output attributes of each candidate pair are considered at 106. Consideration of descriptor similarity and inter-process relationships may not be sufficient to decide on merging or refactoring candidate task pairs, and may result in inappropriate combinations and mergers. For example, tasks sharing a descriptor similarity may require different inputs, or generate different outputs, wherein the needs of a first process may not be met by a match candidate task in the other, second process. Thus, embodiments according to the present invention compare the input and output attributes of the candidate matching tasks to make a final determination. In the present example, the "Get Service Plan by Plan ID" task 206 and the "Get Multi-Line Service Plan" task 226 receive the same inputs ("Service Plan ID" and "Customer Information" 204) and generate the same outputs (the retrieved "Service Plan" and associated "Customer Information" 208), confirming the candidate pair 206/226 as a match for consolidation. The "Create Pre Service Order" task 210 and "Create Cart" 230 task also receive the same inputs (the retrieved "Service Plan" and associated "Customer Information" 208) and generate similar outputs that are not the same but are analogous (the "Pre Service Order" 212 and the "Cart" 232 outputs respectively), thereby also confirming the candidate pair 210/230 as a match for consolidation.

Figure 3:
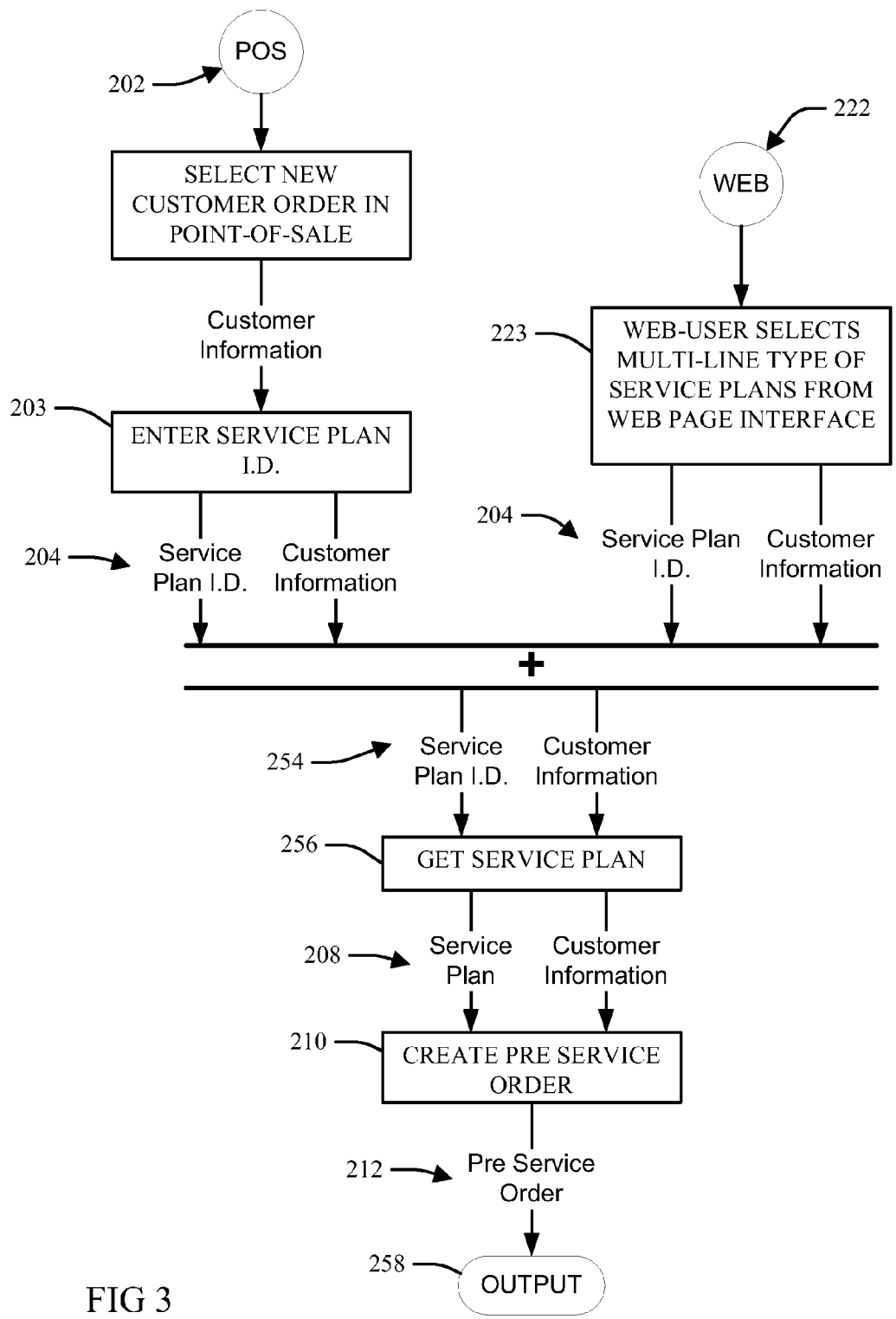
FIG. 3 provides a diagrammatic illustration of a consolidation of the two processes of FIG. 2 according to the present invention.

At 108 the confirmed candidate pairs are consolidated as a function of the input/output analysis at 106, which may include merging a confirmed candidate pair into a new merged task, or replacing one of a confirmed candidate pair with the other, optionally by tweaking or expanding a name or descriptor of the selected replacing one of the pair, and the respective processes utilizing the consolidated tasks are harmonized accordingly at 110. FIG. 3 illustrates a harmonization of the first and second processes 202 and 222 as a function of confirmed candidate pair consolidation, wherein the "Get Service Plan by Plan ID" task 206 and the "Get Multi-line Service Plan" 226 task are merged or combined into a new "Get Service Plan" Task 256 having a new name and receiving a combined input 254 from the respective first and second process 202 and 222 "Service Plan ID" and "Customer Information" inputs 204, and optionally with a revised or new descriptor (for example, "acquire telephone service plan from POS or web-based customer interface that matches customer information and customer-selected plan identification"). Consolidation of the "Create Pre Service Order" task 210 and the "Create Cart" task 230 results in selection of the "Create Pre Service Order" task 210 as a replacement for the "Create Cart" task 230, and accordingly of the "Cart" output 232 with the "Pre Service Order" output 212 to generate a common harmonized output 258 for the two processes 202 and 222. The name or descriptor of the new merged or the replacement task may also be created or revised as a function of the name or the descriptor of the merging or replaced task(s).

The above-described task merger system may also be practiced within a process, resulting in intra-process task mergers and consolidations. For example, the tasks 203, 206, 210, 223, 226, and 230 of FIG. 2 may instead occur in one singular SOA process (not shown), their comparisons and the merger of tasks 206 and 226 into new task 256 and the consolidation of tasks 210 and 230 into a selection of task 210 as a replacement for occurrences of task 230 thus occurring inter-process.

In a cloud environment, virtualization of resources allows sharing of resources and use of resources based on need and demand. If business processes are not harmonized, then duplicate business processes may use virtualized resources in a sub optimal form. In one aspect, embodiments of the present invention harmonize business processes before implementing a cloud solution, thereby realizing benefits of shared virtual resources.

Embodiments of the present invention provide for techniques or approaches that reduce the potential for duplicate tasks and allow for early intervention for the determination of commonalities and variations of multiple business processes, and which may be repeated iteratively in a variation-oriented analysis during process modeling whenever a new variation is introduced. Embodiments are also scalable and able to handle more than two processes, may support a variety of end-user or industry-specific process models, and may harmonize tasks or processes in response to the introduction of processes of increased complexity. Traceability of harmonizing decisions, processes and tasks may also be provided, for example logging each in one or more searchable databases which may be used to back-up or undo any particular harmonization. Embodiments may also help to identify re-usability of tasks early in a service modeling process, for example prior to a first implementation or request for system resources.

Figure 4:
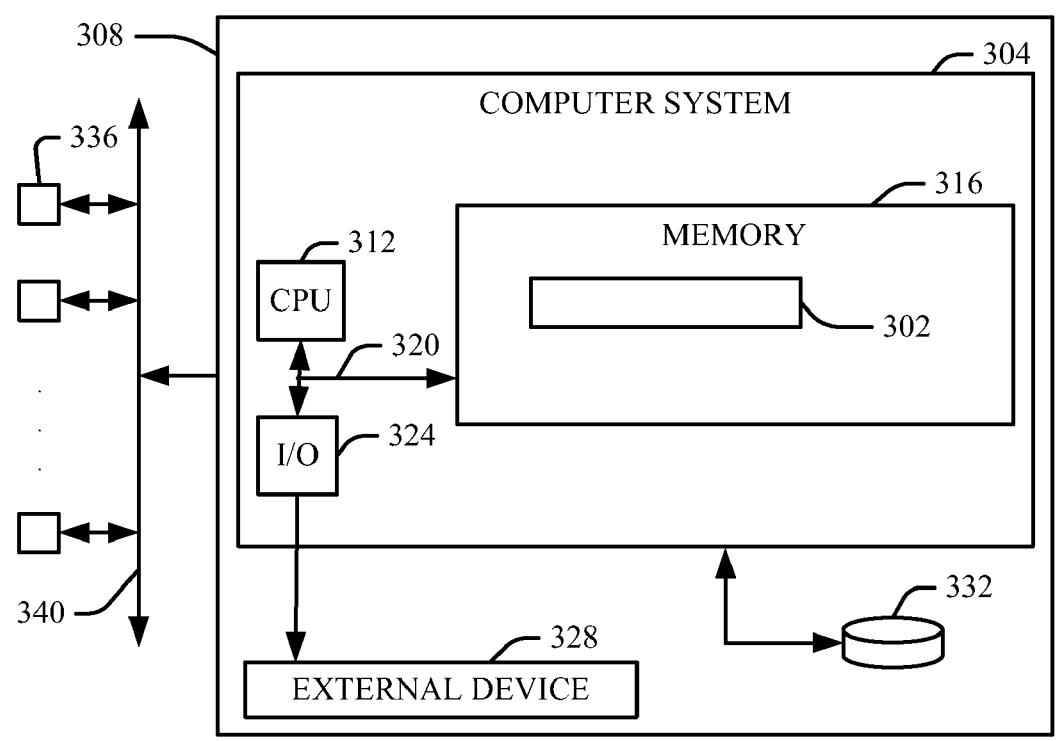
FIG. 4 is a computerized implementation of an embodiment of the present invention.

Referring now to FIG. 4, an exemplary computerized implementation of an embodiment of the present invention includes computer or other programmable device 304 in communication with devices 336 (for example, a data sensor 110 or computer running the browser application 120 of FIG. 1) that analyzes SOA processes and tasks according to the present invention; for example, as configured by and in response to computer readable code 302 in a file residing in a memory 316 or a storage system 332 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that an application of an embodiment of the invention can be deployed, managed, serviced, etc. by a service provider who offers to implement, deploy, and/or perform the functions of the present invention for others.

The computer 304 comprises various components, some of which are illustrated within the computer 304. More particularly, as shown, the computer 304 includes a processing unit (CPU) 312 in communication with one or more external I/O devices/resources 328 and storage systems 332 (which may comprise the data archive manager 112 of FIG. 1). In general, the processing unit 312 may execute computer program code, such as the code to implement one or more of the process steps illustrated in the Figures, which is stored in the memory 316 and/or the storage system 332.

The network infrastructure 308 is only illustrative of various types of computer infrastructures for implementing the invention. For example, in one embodiment, computer infrastructure 308 comprises two or more computing devices (e.g., a server cluster) that communicate over a network. Moreover, the computer 304 is only representative of various possible computer systems that can include numerous combinations of hardware. To this extent, in other embodiments, the computer 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 340 can comprise any system for exchanging information with one or more of devices or external servers 328, 332, 336, etc. Still further, it is understood that one or more additional components (e.g., system software, math co-processing unit, etc.) not shown in FIG. 4 can be included in the computer 304.

In another embodiment, the invention provides a method that performs the process steps of the invention on a subscription, advertising, and/or fee basis. That is, a service provider could offer to manage harmonizing SOA business processes by consolidating tasks. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles described above for harmonizing SOA business processes by consolidating tasks. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers 304, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for harmonizing business process tasks, the method comprising:
   comparing by a processing unit descriptors associated with each of a plurality of business process tasks of different and separate processes of a service oriented architecture, wherein the descriptors associated with each of the tasks comprise a task name, a text description of the task, a predicate task that provides an input to the task in the service oriented architecture, and a subsequent task receives an output generated from the task in the service oriented architecture;
   identifying by the processing unit a first task of the plurality of business process tasks that is within a first process of the service oriented architecture, and a second task of the plurality of business process tasks that is within a second process of the service oriented architecture that is different and separate from the first process, as a candidate task pair for consolidation as a function of determining that they have a text term in common in their task names or in their text descriptions;
   comparing by the processing unit the inputs received from the predicate tasks of each of the candidate pair tasks and the outputs generated by each of the candidate pair tasks to their subsequent tasks;
   confirming by the processing unit consolidation of the candidate pair tasks if the compared inputs to the first and second task are similar and the compared outputs of the first and second task are similar;
   consolidating by the processing unit the confirmed candidate pair tasks by merging the confirmed candidate pair tasks into a new merged task or replacing a one of the first and the second tasks with a replacement other of the first and the second tasks; and
   generating by the processing unit an output from the consolidated candidate pair tasks as a common harmonized output for the subsequent tasks of the first and the second tasks.

2. The method of claim 1,
   wherein the consolidating the confirmed candidate pair tasks comprises merging the confirmed candidate pair tasks into a new merged task having a new descriptor and receiving a combined input from each of the predicate tasks that provide the inputs to the respective first and second tasks if the compared inputs from the predicate tasks are the same and the compared outputs generated to the subsequent tasks are the same.

3. The method of claim 1, wherein the consolidating the confirmed candidate pair tasks comprises replacing the one of the confirmed candidate pair with the replacement other of the confirmed candidate pair if a one of the compared inputs from the predicate tasks are analogous but not the same, and the compared outputs generated to the subsequent tasks are analogous but not the same.

4. The method of claim 1, further comprising:
   logging by the processing unit the consolidating of the confirmed candidate pair tasks for traceability.

5. The method of claim 1, wherein the identifying the candidate pair for consolidation further comprises:
   recognizing that a third task and a fourth task of the plurality of business process tasks are a preliminary candidate pair for consolidation as a function of identifying that the third task is linked in an input/output business process relationship to the first task as one of the tasks predicate or the subsequent to the first task, and of identifying that the fourth task is linked in the same input/output business process relationship to the second task.

6. The method of claim 1, wherein the identifying the candidate pair for consolidation further comprises:
   recognizing that a third task and a fourth task of the plurality of business process tasks are a preliminary candidate pair for consolidation, wherein the third task is linked in an input/output business process relationship to the first task as one of the tasks predicate or subsequent to the first task, and the fourth task is linked in the same input/output business process relationship to the second task; and
   identifying the first task and the second task as the candidate task pair for consolidation as a function of the similarity of the first and second task descriptors and of the input/output business process relationship of the third task to the first task and the fourth task to the second task.

7. The method of claim 6, wherein the identifying the first task and the second task as the candidate task pair for consolidation further comprises:
   determining a value of a degree of similarity of the first task descriptor to the second task descriptor;
   weighting the determined value of the degree of similarity to generate an increased value as a function of the input/output business process relationship of the third task to the first task and of the fourth task to the second task increasing;
   comparing the increased value of the degree of similarity to a similarity threshold criteria; and
   identifying the first task and the second task as the candidate task pair consolidation in response to the compared increased value meeting the similarity threshold criteria, wherein the determined value may not meet the similarity threshold criteria.

8. A system comprising:
- a processing unit in communication with a computer readable memory and a tangible computer readable storage medium;
- wherein the processing unit, when executing program instructions stored on the tangible computer readable storage medium via the computer readable memory:
- compares descriptors associated with each of a plurality of business process tasks of different and separate processes of a service oriented architecture, wherein the descriptors associated with each of the tasks comprise a task name, a text description of the task, a predicate task that provides an input to the task in the service oriented architecture, and a subsequent task receives an output generated from the task the service oriented architecture;
- identifies a first task of the plurality of business process tasks that is within a first process of the service oriented architecture, and a second task of the plurality of business process tasks that is within a second process of the service oriented architecture that is different and separate from the first process, as a candidate task pair for consolidation as a function of determining that they have a text term in common in their task names or in their text descriptions;
- compares the inputs received from the predicate tasks of each of the candidate pair tasks and the outputs generated by each of the candidate pair tasks to their subsequent tasks;
- confirms consolidation of the candidate pair tasks if the compared inputs to the first and second tasks are similar and the compared outputs of the first and second tasks are similar;
- consolidates the confirmed candidate pair tasks by merging the confirmed candidate pair tasks into a new merged task or replacing a one of the first and second tasks with a replacement other of the first and second tasks; and
- generates an output from the consolidated candidate pair tasks as a common harmonized output for the subsequent tasks of the first and the second tasks.

9. The system of claim 8, wherein the processing unit, when executing the program instructions stored on the computer readable storage medium via the computer readable memory, further consolidates the confirmed candidate pair tasks by merging the confirmed candidate pair tasks into a new merged task having a new descriptor and receiving a combined input from each of the predicate tasks that provide inputs to the respective first and second tasks if the compared inputs from the predicate tasks are the same and the compared outputs generated to the subsequent tasks are the same.

10. The system of claim 8, wherein the processing unit, when executing the program instructions stored on the computer readable storage medium via the computer readable memory, further identifies the candidate pair for consolidation by:
- recognizing that a third task and a fourth task of the plurality of business process tasks are a preliminary candidate pair for consolidation as a function of identifying that the third task is linked in an input/output business process relationship to the first task as one of the tasks predicate or subsequent to the first task, and of identifying that the fourth task is linked in the same input/output business process relationship to the second task.

11. The system of claim 8, wherein the processing unit, when executing the program instructions stored on the computer readable storage medium via the computer readable memory, further identifies the candidate pair for consolidation by:
- recognizing that a third task and a fourth task of the plurality of business process tasks are a preliminary candidate pair for consolidation, wherein the third task is linked in an input/output business process relationship to the first task as one of the tasks predicate or subsequent to the first task, and the fourth task is linked in the same input/output business process relationship to the second task; and
- identifying the first task and the second task as the candidate task pair for consolidation as a function of the similarity of the first and second task descriptors and of the input/output business process relationship of the third task to the first task and the fourth task to the second task.

12. The system of claim 11, wherein the processing unit, when executing the program instructions stored on the computer readable storage medium via the computer readable memory, further identifies the first task and the second task as the candidate task pair for consolidation by:
- determining a value of a degree of similarity of the first task descriptor to the second task descriptor;
- weighting the determined value of the degree of similarity to generate an increased value as a function of the input/output business process relationship of the third task to the first task and of the fourth task to the second task increasing;
- comparing the increased value of the degree of similarity to a similarity threshold criteria; and
- identifying the first task and the second task as the candidate task pair consolidation in response to the compared increased value meeting the similarity threshold criteria, wherein the determined value may not meet the similarity threshold criteria.

13. A computer program product for harmonizing business processes tasks, the computer program product comprising:
- a computer readable storage medium;
- first program instructions to compare descriptors associated with each of a plurality of business process tasks of different and separate processes of a service oriented architecture, wherein the descriptors associated with each of the tasks comprise a task name, a text description of the task, a predicate task that provides an input to the task in the service oriented architecture, and a subsequent task receives an output generated from the task in the service oriented architecture;
- wherein the first program instructions are further to identify a first task of the plurality of business process tasks that is within a first process of the service oriented architecture, and a second task of the plurality of business process tasks that is within a second process of the service oriented architecture that is different and separate from the first process, as a candidate task pair for consolidation as a function of determining that they have a text term in common in their task names or in their text descriptions;
- second program instructions to compare the inputs received from the predicate tasks of each of the candidate pair tasks and the outputs generated by each of the candidate pair tasks to their subsequent tasks, and to confirm consolidation of the candidate pair tasks if the compared inputs to the first and the second tasks are similar and the compared outputs of the first and the second task are similar; and third program instructions to consolidate the confirmed candidate pair tasks by merging the confirmed candidate pair tasks into a new merged task or replacing a one of the first and second tasks with a replacement other of the first and second tasks, and to generate an output from the consolidated candidate pair tasks as a common harmonized output for the subsequent tasks of the first and the second tasks;

wherein the first, second and third program instructions are stored on the computer readable storage medium.

14. The computer program product of claim 13, wherein the third program instructions are further to consolidate the confirmed candidate pair tasks by merging the confirmed candidate pair tasks into a new merged task having a new descriptor and receiving a combined input from each of the predicate tasks that provide the inputs to the respective first and second tasks if the compared inputs from the predicate tasks are the same and the compared outputs generated to the subsequent tasks are the same.

15. The computer program product of claim 13, wherein the first program instructions are further to identify the candidate pair for consolidation by:

recognizing that a third task and a fourth task of the plurality of business process tasks are a preliminary candidate pair for consolidation as a function of identifying that the third task is linked in an input/output business process relationship to the first task as one of the tasks predicate or subsequent to the first task, and of identifying that the fourth task is linked in the same input/output business process relationship to the second task.

16. The computer program product of claim 13, wherein the first program instructions are further to identify the candidate pair for consolidation by:

recognizing that a third task and a fourth task of the plurality of business process tasks are a preliminary candidate pair for consolidation, wherein the third task is linked in an input/output business process relationship to the first task as one of the tasks predicate or subsequent to the first task, and the fourth task is linked in the same input/output business process relationship to the second task; and identifying the first task and the second task as the candidate task pair for consolidation as a function of the similarity of the first and second task descriptors and of the input/output business process relationship of the third task to the first task and the fourth task to the second task.

17. The computer program product of claim 16, wherein the first program instructions are further to identify the first task and the second task as the candidate task pair for consolidation by:

determining a value of a degree of similarity of the first task descriptor to the second task descriptor;

weighting the determined value of the degree of similarity to generate an increased value as a function of the input/output business process relationship of the third task to the first task and of the fourth task to the second task increasing;

comparing the increased value of the degree of similarity to a similarity threshold criteria; and identifying the first task and the second task as the candidate task pair consolidation in response to the compared increased value meeting the similarity threshold criteria, wherein the determined value may not meet the similarity threshold criteria.

* * * * *